Patented May 3, 1932

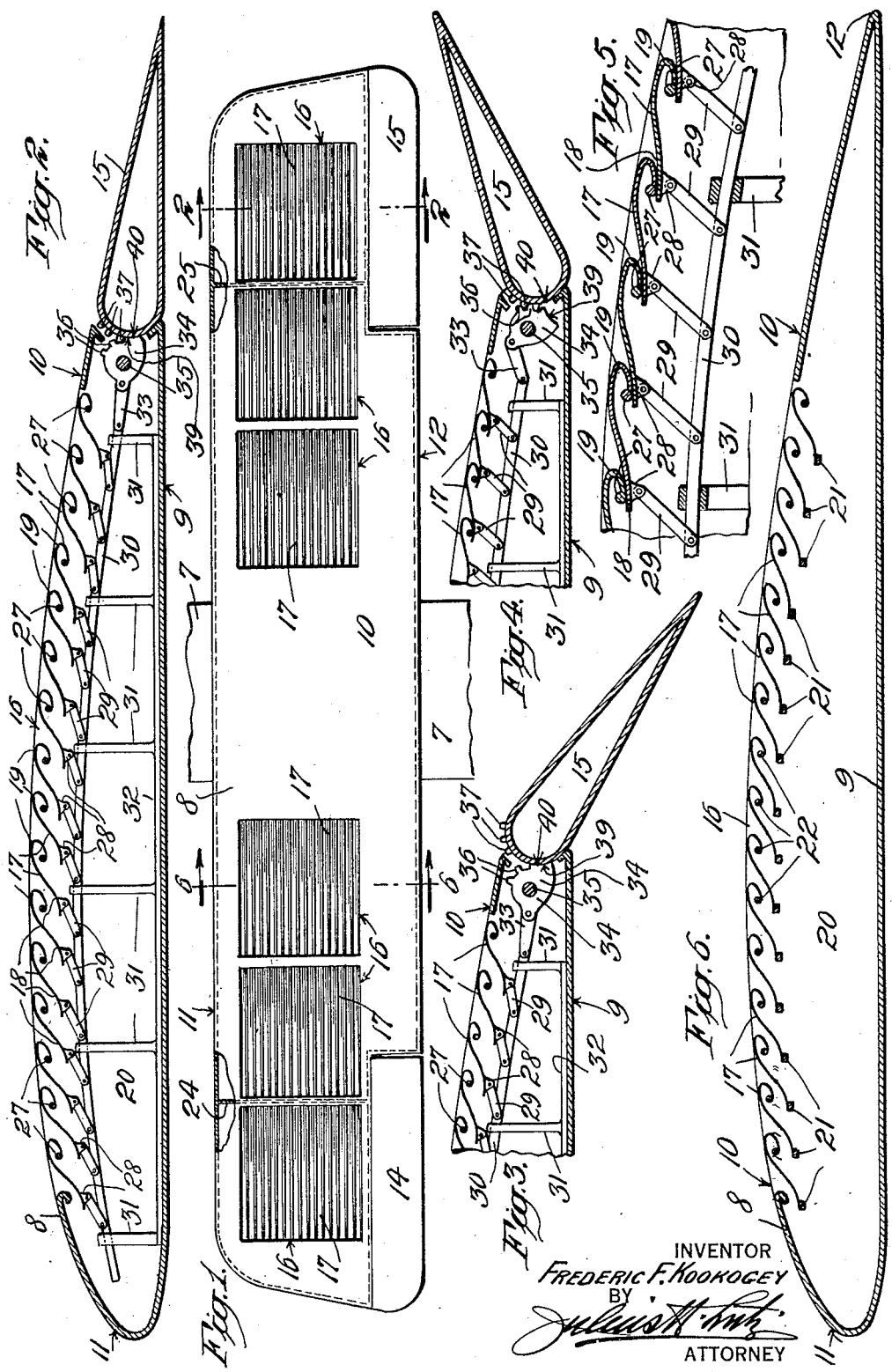

1,856,643

UNITED STATES PATENT OFFICE

FREDERIC F. KOOKOGEY, OF NEW YORK, N. Y.

WING FOR AEROPLANES

Application filed March 1, 1930. Serial No. 432,380.

The invention relates to an improvement in aeroplanes and other aircraft and more particularly to an improvement in the upper surfaces of aircraft, such as the upper surface of an aeroplane wing.

The general object of the invention is to increase the lifting power of the lifting elements of aircraft and more particularly the lifting power of aeroplane wings so as to permit the use of long chord wings in the larger and heavier machines. A more specific object of the invention is to produce an aeroplane wing provided with means whereby the wing may have a variable lifting power so that the flight of the aeroplane may be more positively controlled and excessive banking prevented. These and other objects of the invention which will appear as the description proceeds are accomplished by means of the improved construction hereinafter fully described and particularly pointed out in the appended claims.

In the accompanying drawings the invention is illustrated as applied to an aeroplane wing. Figure 1 is a top plan of an aeroplane wing of usual form with the construction or device constituting the present invention applied thereto; Fig. 2 is a section taken on the line 2—2 of Fig. 1, but on an enlarged scale, the wing being shown in the condition of normal flight; Fig. 3 is a detail of the rear or right hand end of Fig. 2, but showing the aileron in position to increase the angle of incidence of the end of the wing on which it is mounted; Fig. 4 is a view similar to Fig. 3, but with the aileron in position to decrease the angle of incidence of the wing end; Fig. 5 is an enlarged detail section of the adjustable vanes; and Fig. 6 is a section taken on the line 6—6 through the fixed vanes.

The invention is applicable to the upper surfaces of the lifting elements of aircraft, such as the upper surfaces of aeroplane wings, such surfaces being normally under reduced or negative pressure when the aircraft is in flight. The increased lifting effect is secured by creating a partial vacuum in the space immediately below the upper surface of the lifting element of the aircraft. When the invention is applied to an aeroplane wing, the wing will be hollow and preferably composed of substantially airtight material so that the partial vacuum may be created within the wing. The partial vacuum is created within the aeroplane wing when the aeroplane is in flight by providing openings in the upper surface of the wing and arranging in the openings a series of slats or vanes positioned transversely to the direction of flight, that is, at right angles to the longitudinal axis of the aeroplane. The slats or vanes are preferably set at an angle slanting rearwardly and their upper ends are curved and are substantially flush with the upper surface of the wing. As thus arranged the vanes do not interfere with the flight of the aeroplane and cause a partial vacuum to be created in the space below the vanes. The vanes may be variously formed and yet serve the same purpose and may be composed of thin sheets of metal or of fabric stretched over suitable forms. If the space below the vanes is too deep, a false flooring may be provided to avoid the formation of air pockets and to insure uniform lifting effect at all points of the wing under all conditions of normal flight. Other conditions of flight are provided for by making one or more series of the vanes adjustable so as to prevent the formation of the partial vacuum at particular points.

In the embodiment of the invention illustrated in the drawings, the fuselage of an aeroplane is indicated at 7 and a wing or aerofoil at 8. The wing or aerofoil is hollow and consists of a lower or positive pressure surface 9, an upper or reduced pressure surface 10, and a rounded front or leading edge 11. The rear or trailing edge 12 is formed where the lower and upper surfaces meet at a sharp angle. The outer ends of the rear edge 12 of the wing are recessed to receive the ailerons 14 and 15. These parts may be of usual construction and function in the usual manner.

To apply the construction of the invention to the lifting element or wing 8 of the aeroplane, a series of openings 16, preferably square or rectangular in outline, are cut in the upper surface 10 of the wing 8. In the illustrated embodiment there are six such openings, but their number may be varied according to the size of the wing or other surface in which they are cut.

In each opening there are arranged a plurality of rearwardly slanting vanes, indicated generally at 17. Each vane consists of a lower or tail section 18 and an upper or curved section 19 which extends rearwardly beyond the tail end of the next succeeding vane. The vanes in the four inner openings 16 are fixed in the positions shown in Fig. 6 to cause the creation of a partial vacuum in the space 20 below the vanes when the aeroplane is in flight, that is to say, with the upper ends 19 of the vanes spaced apart from the tail ends 18 of the next succeeding vanes. For this purpose the lower or tail ends of the vanes are secured to the cross pieces 21, and the inturned ends of the upper sections of the vanes are secured to the cross pieces 22.

The end sections of the wing in which the outer openings are cut are separated internally from the middle section of the wing by the partitions 24 and 25, and in the outer openings cut in these end sections are located adjustable vanes so that the partial vacuum in the end sections of the wing may be made or broken as desired to answer varying conditions of flight without affecting the partial vacuum in the middle section 20.

The vanes in the outer opening 16 may be made adjustable by securing the inturned ends of the curved upper sections of the vanes to rotatably mounted rods 27. The lower or tail ends of the vanes in the outer openings are provided with the pieces 28 pivotally connected with the upper ends of the links 29 the lower ends of which are connected with a bar 30 slidably supported in the uprights 31 rising from a bottom piece 32 resting on the lower wing surface 9. At its rear end each bar 30 is connected by a link 33 with a segmental gear 34 mounted to turn on a stud 35. The teeth 36 on each gear disk 34 are adapted to engage with the teeth 37 on the front rounded end of the corresponding aileron 15.

When the aeroplane or other aircraft is proceeding in normal flight the adjustable vanes, as well as the fixed vanes, will be set so that a partial vacuum will be created in the space under the vanes and thereby give the lifting element in which the vanes are mounted greater lifting power. In the case of the aeroplane illustrated, the adjustable vanes are held in vacuum creating position so long as the ailerons are in the position they assume in normal flight, as shown in Fig. 2. In this condition of the parts, the rounded part 39 of each aileron is in engagement with the corresponding concave part 40 of the gear disk 34. When it is necessary to increase the angle of incidence of one end of the wing or aerofoil 8, so that the aileron associated therewith is turned down, as shown in Fig. 3, the parts 39 and 40 continue in engagement with the result that the vanes are kept open so as to assist in lifting the wing end in question. When however the angle of incidence is to be decreased at one end of the wing, the aileron associated with that end is turned up, as shown in Fig. 4, with the result that the teeth 36 and 37 engage, the gear disk 34 is turned and the bar is moved to swing the vanes and close the upper surface of the lower ends of the vanes against the under surface of the curved upper ends of the vanes, thereby breaking the partial vacuum in the space under the vanes and so assisting in depressing the wing end in question.

Having thus described the invention what I claim as new is:—

1. In an aeroplane having a hollow wing provided at each end of its rear edge with an aileron, the upper surface of the wing being provided throughout its length with a series of openings, the two end openings being substantially opposite the ailerons, a series of rearwardly slanting, overlapping spaced-apart vanes located in each opening transversely of the direction of flight of the aeroplane, the vanes in the inner openings being fixed and the vanes in the end openings being movably mounted, and means controlled by the ailerons for moving the movable vanes to close them together or separate them according to the positions of the ailerons.

2. In an aeroplane having a hollow wing provided with an aileron at its rear edge, the upper surface of the wing being provided with an opening substantially opposite the aileron, a series of rearwardly slanting, overlapping vanes located in the opening and arranged transversely of the direction of flight of the aeroplane, the upper ends of the vanes being curved and pivotally mounted, a slidably mounted bar located under the vanes, links for pivotally connecting the free lower ends of the vanes with the bar, and operative connections between the bar and the aileron whereby when the aileron is turned in one direction the lower ends of the vanes are moved upwardly against the upper ends of the next succeeding vanes, and when the aileron is moved in the opposite direction the lower ends of the vanes are separated from the upper ends of the next succeeding vanes.

3. In an aeroplane having a hollow wing provided with an aileron at its rear edge, the upper surface of the wing being provided with an opening substantially opposite the aileron, a series of rearwardly slanting, overlapping vanes located in the opening and arranged transversely of the direction of flight of the aeroplane, said vanes being movably mounted so that they may be separated from each other and closed together, and operative connections between the vanes and the aileron whereby when the aileron is turned in one direction the vanes are separated and when the aileron is turned in the opposite direction the vanes are closed together.

FREDERIC F. KOOKOGEY.